United States Patent [19]

Di Phillipo et al.

[11] 3,830,158
[45] Aug. 20, 1974

[54] INITIATOR ASSEMBLY
[75] Inventors: Joseph M. Di Phillipo, Philadelphia, Pa.; John E. Holvoet, Edgewood, Md.
[73] Assignee: The United States of America as represented by the Secretary of the Army, Washington, D.C.
[22] Filed: Mar. 1, 1973
[21] Appl. No.: 337,267

[52] U.S. Cl. .............................. 102/70 R, 102/85.2
[51] Int. Cl. .............................................. F42c 9/00
[58] Field of Search ............ 102/85, 85.2, 85.6, 64, 102/27, 70

[56] References Cited
UNITED STATES PATENTS

| | | | |
|---|---|---|---|
| 1,312,212 | 8/1919 | Saloun | 102/85.2 |
| 3,352,237 | 11/1967 | Turquois | 102/85.2 |
| 3,657,958 | 4/1972 | Wells | 102/27 |
| 3,705,552 | 12/1972 | Lerman | 102/64 |
| 3,712,232 | 1/1973 | Abel et al. | 102/85.2 |

*Primary Examiner*—Samuel W. Engle
*Attorney, Agent, or Firm*—Edward J. Kelly; Herbert Berl; William Sommer

[57] ABSTRACT

An initiator assembly having a pyrotechnic time delay which can be adjusted to any selected time delay setting within the adjustable range. A male adjustment screw, secured to a firing head assembly, has an internal cavity filled with booster propellant charges and is threadedly attached to the female threads of a flange nut. The adjustment screw has a lateral orifice fluidly communicating the cavity with the exterior surface or crest of a forwardmost male thread portion and a selected surface portion along a pyrotechnic fuze that lines the helically contoured root of the female threads and is embedded in the main propellant charge.

4 Claims, 1 Drawing Figure

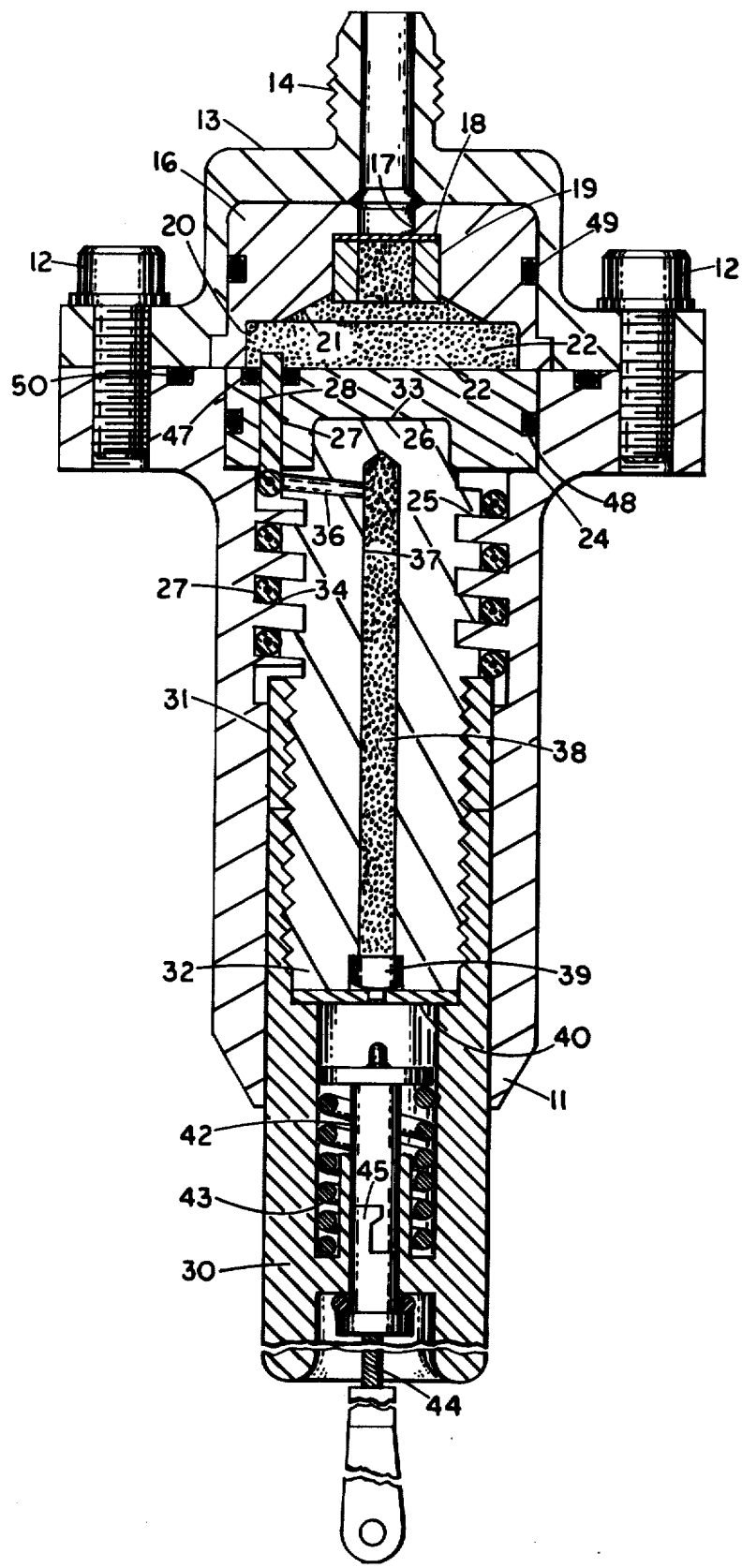

INITIATOR ASSEMBLY

The invention described herein may be manufactured, used, and licensed by or for the Government for governmental purposes without the payment to us of any royalty thereon.

This invention relates to initiators, and more particularly, to a propellant gas initiator assembly.

It is the object of the invention to provide an initiator assembly arrangement having a pyrotechnic time delay adjustment that is selected for any value within a continuous range.

Another object of the invention is to provide such an arrangement that can be economically produced and is highly compatable with propellant actuated devices.

A further object of the invention is to provide such an arrangement which is operationally reliable and requires but a minimum of space.

These and other objects, features and advantages will become more apparent from the following description and accompanying drawings in which the sole FIGURE is a sectional view of an initiator assembly embodying the principles of the invention.

The housing of the ballistic initiator assembly includes a flange nut 11 secured by a plurality of suitable cap screws 12, 12 to flange coupling 13 that has a reduced forwardmost threaded and centrally apertured nose portion 14 that is securable to a predetermined propellant actuated device (not shown). The coupling 13 has an appropriate internal configuration to accommodate cylindrical cartridge case 16 the central passage or aperture 17 of which is closed upon assembly of blow-out disc 18 that is secured in place by a press-fitting cylindrical bushing 19. Case 16 has a rearwardly opening cup-like cylindrical recess 20, that together with the bushing interior and intermediate tapered surface or conical cavity 21 contain the initiator main propellant charge 22. The charge 22 upon assembly is retained by cylindrical plug 24 that is seated in an appropriate recess in the forward face of the flange nut 11 forwardly of an intermediate portion thereof that contains internal threads 25. The rearmost internal surface of flange nut 11 is cylindrically shaped to slidingly receive the firing head assembly 30 and an appropriate lock nut 31, both of which are threadedly secured to an externally threaded rearward portion of adjustment screw 32 that has a reduced cylindrical protuberance or central nose portion 33 which seats in a rearwardly opening cylindrical central recess 26 in plug 24 when the male threaded portion 34 of adjustment screw 32 is advanced through flange nut female threads 25 to its forwardmost position as shown.

The flank of the flange nut female threaded portion 25 exceeds the flank of the adjustment screw male threaded portion 34 by a predetermined clearance which is substantially lined with the major length of a helically wrapped pyrotechnic fuze 27. The forward end of the pyrofuze 25 extends through the offset longitudinal passage 28 in plug 24 and into the main propellant charge 22. The flank of the helical substantially square female threads 25 is substantially equal to the pitch of the female threads 25, and the flank of the mating male threads 34 is substantially equal to half of the male thread pitch. The diameter of the pyrofuze 27 is equal to slightly less than half the pitch of the threads 25, 34.

The adjustment screw 32 has a lateral fluid communicating passage or orifice 36 that extends from the crest of a forwardmost portion of the male threads 34 to a central adjustment screw passage or cavity 37 containing a booster propellant charge 38 of boron potassium nitrate ($B-KNO_3$) pellets that are ignited by primer 39 located at the rearward end of passage 37 adjacent the central opening of firing pin guide 40. The firing pin 42 is actuated by a rearward pull upon the lanyard pin 44, as the lanyard sear 45 momentarily remains engaged with the mating portion of the firing pin to rearwardly withdraw and cock the firing pin against its thus compressed or loaded spring 43. Release of the sear engagement permits the firing pin to be propelled forward under the spring force and stride the primer 39, the hot gases from the primer igniting the booster charge 38 which in turn delivers hot gases through orifice 36 to ignite the area or portion of the pyrofuze or small column insulation delay 27 that is adjacent orifice 36.

The ignited or burning pyrofuze 27 will ignite the main propellant charge 22 after a predetermined time delay which thus can be originally set for any value within a continuous range, the setting being simply controlled by rotational adjustment of adjusting screw 32 and firing head assembly 30 relative to flange nut 11. The delay time can be increased by withdrawing the adjustment screw 32 to any desired position in which the orifice 36 aligns with the pyrofuze 27.

O-ring 47 in plug 24 surrounds pyrofuze 27 to prevent gas leakage through plug passage 28 that might otherwise ignite the main propellant charge 22 prematurely. Peripheral O-ring seals 48, 49 are provided for the plug 24 and cartridge case 16, and the forward face of flange nut 11 is suitably recessed to accommodate O-ring seal 50.

Various modifications, changes or alterations may be resorted to without departing from the scope of the invention as defined in the appended claims.

We claim:

1. In an initiator assembly having a flange coupling and a flange nut secured thereto, said flange coupling containing a cartridge case and its propellant charge, said flange nut carrying a firing head assembly at one end thereof and a plug positioned adjacent said propellant charge, said plug having an offset longitudinal passage, said firing head assembly housing a spring biased firing pin,
   the interior surface of said flange nut having intermediate its length a female threaded portion,
   an adjustment screw threadedly secured in a forward end of said firing head assembly and having a male threaded portion mating with said flange nut female threaded portion, the flank of said flange nut female threaded portion exceeding the flank of said male threaded portion by a predetermined clearance, said adjustment screw containing a primer adjacent said firing pin and a booster propellant charge longitudinally extending through said adjustment screw,
   a helically wrapped pyrotechnic fuse having a first portion seated in and extending a substantial length of said clearance and a second portion extending through said plug passage, and
   a lateral passage in the adjustment screw fluidly communicating said booster propellant charge with said pyrotechnic fuse so that said lateral passage is capable of communicating with any surface of the first portion of said pyrotechnic fuse.

2. The structure in accordance with claim 1 wherein the flank of the flange nut female threads is substantially equal to the pitch of the female threads, and the flank of the adjustment screw male threads is substantially equal to half of the male thread pitch.

3. The structure according to claim 2 wherein said pyrotechnic fuze has a diameter equal to less than half of the pitch of said female and male threads.

4. The structure according to claim 3 wherein said adjustment screw lateral passage extends from a central adjustment screw passage containing said booster charge to a forwardmost portion of said male threaded portion.

* * * * *